United States Patent [19]

Goodwin et al.

[11] Patent Number: 4,824,498
[45] Date of Patent: Apr. 25, 1989

[54] STRIPPALBLE SPONGE CUSHION UNDERLAY FOR A SURFACE COVERING, SUCH AS CARPETING

[75] Inventors: Roy D. Goodwin; Henry S. Ostrowski, both of Greenville, S.C.; Gary J. Davis, Chesterfield, Mo.

[73] Assignee: James River Corporation, Richmond, Va.

[21] Appl. No.: 71,426

[22] Filed: Jul. 9, 1987

[51] Int. Cl.[4] .................. E04B 2/00; E04F 13/00; B32B 3/26; B32B 7/06
[52] U.S. Cl. ............................. 156/71; 156/344; 428/95; 428/246; 428/247; 428/286; 428/304.4; 428/317.1
[58] Field of Search ............... 428/44, 45, 47, 48, 428/95, 96, 246, 286, 287, 317.1, 317.3, 317.7, 201, 202, 212, 247, 304.4; 156/71, 344

[56] References Cited

U.S. PATENT DOCUMENTS

| | | | |
|---|---|---|---|
| 4,522,857 | 6/1985 | Higgins | 428/95 |
| 4,557,774 | 12/1985 | Hoopengardner | 156/71 |
| 4,647,484 | 3/1987 | Higgins | 428/95 |

FOREIGN PATENT DOCUMENTS 737431  6/1966  Canada .................. 428/317.1

Primary Examiner—William J. Van Balen
Attorney, Agent, or Firm—Finnegan, Henderson, Farabow, Garrett & Dunner

[57] ABSTRACT

A sponge cushion material is suitable for use as a carpet underlay. The sponge cushion has a cellular layer bonded to two nonwoven textile layers which can delaminate. The carpet is adhesively bonded to the cellular layer and one of the textile layers is adhesively bonded to a floor. The carpet can be easily removed by pulling it away from the floor so that the two textile layers delaminate and one of the textile layers remains bonded to the floor.

35 Claims, 1 Drawing Sheet

STRIPPALBLE SPONGE CUSHION UNDERLAY FOR A SURFACE COVERING, SUCH AS CARPETING

BACKGROUND OF THE INVENTION

This invention relates to a cellular stock material having a particular backing structure. More particularly, this invention relates to a sponge cushion underlay for a surface covering, such a as a carpet, and to a method of easily removing the surface covering from a supporting surface, such as a floor or a wall, to which it is adhesively bonded.

Carpeting is usually securely fastened to a floor in order to minimize safety risks and to extend the life of the carpet. The use of an adhesive to firmly bond carpeting to a floor has found widespread acceptance. Carpeting can be easily installed with an adhesive and minimal maintenance is required, since the carpet remains in position even with extended use.

The adhesive must form a strong bond between the carpet and the floor to withstand the heavy compressive loads and lateral forces frequently encountered. For example, furniture, instruments and rolling machinery in residential, institutional and industrial environments can readily induce movement in a carpet that is not firmly bonded to the floor.

It is conventional to install a sponge or foam cushion between the carpet and the floor to enhance comfort and to extend the life of the carpet. The cushion is glued to the floor, and the carpeting is then glued to the cushion. The low cost cushion materials used in making carpet underlays usually have very low tensile strength. Consequently, when the carpet is stripped from the floor for repair or replacement, the sponge or foam is torn apart and a portion of the cushion remains bonded to the floor. Manual removal of the cushion adhering to the floor is not practical for economic reasons.

Thus, there exists a need in the art for a cushion material capable of meeting the conflicting requirements of a carpet underlay. The cushion material must be capable of being securely bonded to a floor to withstand high compressive loads and lateral forces without detaching from the floor. In addition, the cushion must be easily strippable from the floor when the carpet is removed.

SUMMARY OF THE INVENTION

Accordingly, this invention aids in fulfulling these needs in the art. More particularly, this invention provides a cushion underlay for a surface covering, wherein the cushion underlay comprises a solid, flexible, resilient, cellular layer having a top surface for bonding to the underside of the surface covering and an opposing bottom surface. A solid, flexible, non-strippable first layer having opposing first and second surfaces is adhered to the bottom surface of the cellular layer. A solid, flexible, second layer is adhered to the second surface of the first layer. The second layer is strippable from the first layer, but the cellular layer is not strippable from the first layer.

In a preferred embodiment of the invention a cushion underlay for a carpet comprises a solid, flexible, resilient, cellular layer having a top surface for bonding to an underside of a carpet and an opposing bottom surface. A self-supporting, flexible, nonwoven scrim textile layer having an open mesh and opposing first and second surfaces is adhered to the bottom of the cellular layer. A self-supporting, flexible, nonwoven textile web having a denser mesh than the open mesh of the scrim layer is adhesively bonded to the second surface of the scrim layer. The cellular layer is not strippable from the scrim layer, but the scrim layer is strippable from the textile web without tearing the cellular layer.

In addition, this invention provides a laminate comprising a surface covering and a cushion underlay of this invention. The laminate is formed by adhesively bonding the surface covering to the top surface of the cellular layer of the cushion underlay. The second layer is strippable from the first layer, but the surface covering is not strippable from the cellular layer and the cellular layer is not strippable from the first layer.

This invention also provides a method of installing a strippable surface covering and cushion underlay on a solid support. More particularly, a cushion underlay of the invention is adhesively secured to a solid support and the surface covering is adhesively secured to the top surface of the cellular layer of the cushion underlay. When the surface covering is subjected to a force normal to the solid support surface, a composite comprised of the surface covering, cellular layer and first layer is separated from the second layer, but the second layer adheres to the solid support.

The cushion underlay, laminate, and method of the invention make it possible to securely bond a surface covering, such as a carpet, to a solid support to withstand high compressive loads and lateral forces without the surface covering detaching from the support. In addition, the cushion underlay of the invention and surface covering to which it is bonded can be easily stripped from the solid support without tearing apart the cellular layer in the cushion underlay. Thus, this invention makes it possible to meet the conflicting requirements for a strippable carpet underlay material.

BRIEF DESCRIPTION OF THE DRAWINGS

This invention will be more clearly understood by reference to the drawings in which.

DETAILED DESCRIPTION

The cellular sheet material of this invention is suitable for use with a variety of surface coverings under which cushioning is required. As used herein the term "surface covering" has a broad meaning and is intended to include natural and synthetic goods that are adhered to a support surface, where the goods are intended to be removed and replaced. The surface covering can have decorative as well as functional characteristics. Thus, the term includes, for example, floor and wall coverings, such as carpeting, tile and sheet materials. The carpeting can be woven or fusion bonded carpet or carpet tile. Typical sheet materials include vinyl floor coverings having a smooth or embossed wear surface.

The cellular sheet material of the invention is adhesively bonded between the surface covering and a solid support. The support can be rigid or flexible, although rigid supports are most common. Generally, the support has a substantially smooth, planar surface although some surface irregularities can be tolerated. The support can be continuous or discontinuous. Typical examples of solid supports are floors, walls, ceilings, countertops, and automotive interiors.

One embodiment of the cushion underlay of this invention will now be described in connection with a carpet installed over a floor. It will be understood that the following description applies to other surface coverings and solid supports.

Figure 1:
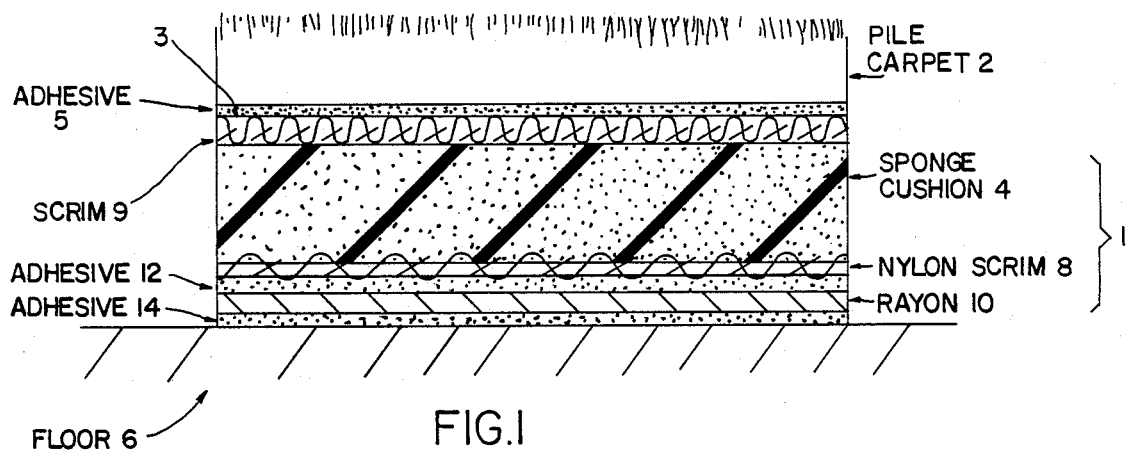
FIG. 1 is a cross-sectional view of a carpet underlay of the invention adhesively bonded to a floor.

Referring to FIG. 1, a pile carpet 2 and a sponge cushion 4 cover a rigid floor 6. The sponge cushion 4 is part of a cushion underlay 1 which also includes a thin, spunbonded nylon textile 8 and a thin, nonwoven rayon textile web 10. The nylon textile 8 typically has a relatively open formation, such as a scrim layer, whereas the rayon textile 10 is of a more dense formation. The rayon textile 10 is bonded to the nylon textile 8 by means of an adhesive 12.

The nylon textile 8 is bonded to the sponge cushion 4. The bond between the textile 8 and the sponge 4 is usually a mechanical bond formed in situ when sponge cushion 4 is formed during blowing of a precursor capable of forming cellular material. Some of the precursor material permeates into the open weave of the nylon textile 8 as shown in FIG. 1. After the blowing process, the resulting blown material stabilizes and a strong mechanical bond is formed between sponge cushion 4 and the textile 8. The resulting cushion underlay 1 in which the nylon textile 8 is bonded between the sponge cushion 4 and the rayon textile 10 represents one embodiment of the invention.

The cushion underlay 1 is firmly secured to the floor 6 by means of an adhesive 14. The carpet 2, in turn, is firmly secured to top surface 3 of the sponge cushion 4 by means of another adhesive 5. The carpet underlay 1 and carpet 2 are thus firmly anchored to the floor to produce a stable system having good resiliency, wearability and energy absorbing characteristics.

Figure 2:
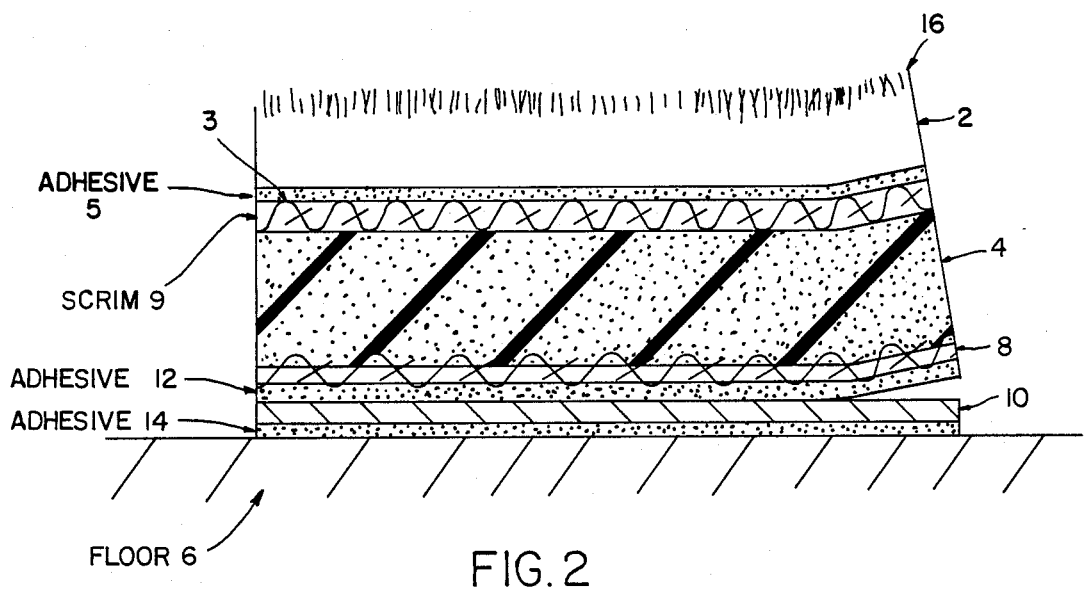
FIG. 2 is a cross-sectional view of the carpet underlay of FIG. 1 partially peeled away from the floor.

FIG. 2 depicts a procedure for removing carpet 2 from the floor 6 prior to replacing the carpet. The carpet is grasped along an edge 16 and pulled away from the floor 6. The nylon textile 8 separates from the rayon textile 10, but the carpet 2 does not separate from the sponge cushion 4, nor does the sponge cushion 4 separate from the nylon textile 8. Likewise, the rayon textile 10 does not separate from the floor 6. Layers that separate from each other under these conditions are referred to herein as "strippable layers." Layers that do not separate from each other under these conditions are referred to as "nonstrippable layers."

Thus, as shown in FIG. 2, the carpet 2, sponge cushion 4, nylon textile 8 and at least a portion of the adhesive 12 can be peeled from the floor 6 without tearing the sponge cushion 4 and without any of the sponge cushion remaining on the floor. Once the carpet 2 and sponge cushion 4 have been removed in this manner, new carpeting and cushion underlay of similar construction can be installed as previously described over the rayon textile 10, and the carpet removal process can be repeated as required. The rayon textile 10 is a thin sheet material that does not adversely affect installation of the new carpeting.

Strippable layers can be obtained by providing a weaker bond between the layers to be separated than the bonds between the other layers of the assembly and by insuring that the strength of the bond between the strippable layers is less than the tensile strength of each of the materials in the assembly, and especially less than the tear strength of the cellular layer.

It will be understood that the cushion underlay 1 shown in FIG. 1 can be inverted and installed so that the layer 3 of the underlay is adhesively bonded to floor 6 and the carpet 2 is adhesively bonded to rayon layer 10. In this embodiment of the invention, the carpet 2 and rayon layer 10 will be strippable as a composite from nylon layer 10 so that the nylon layer and sponge cushion 4 remain anchored to the floor.

It will also be understood that the carpet underlay of the invention can be provided with strippable layers on surface 3 of sponge cushion 4. These additional strippable layers can be similar to the layers 8, 10 and 12 previously described. In this embodiment of the invention, the carpet 2 will be strippable from the cushion underlay 1, and the sponge cushion 4 and nylon layer 8 will be strippable as a composite from the rayon layer 10.

The plural layers forming the cushion underlay of the invention will now be described in more detail.

The sponge cushion 4 can be any self-supporting, flexible cellular material having a substantially continuous solid phase of natural or synthetic origin. The cellular material can be of an open or closed cell structure. Closed cell materials are preferred. The cellular material must be resilient and will typically be of relatively low tear strength. Since the surface covering is stripped from the solid support by lifting and bending the carpet and the cushion underlay as depicted in FIG. 2, it is preferred that the cellular material be capable of being rolled.

An example of a cellular material suitable for use as the sponge cushion 4 in the cushion underlay of the invention is a rubber formed by expanding bulk natural or synthetic rubber to a low density cellular state and preserving the rubber in this state. Another example of a suitable material is a latex foam rubber formed by frothing or expanding a latex, gelling the frothed latex and curing or setting the resulting material to stabilize the material in an expanded state.

More particularly, the cellular material can be comprised of a polyurethane formed from polyfunctional isocyanates, hydroxyl-containing polymers and a suitable catalyst, and blown with a gas formed in situ. Virgin polyurethane foam or a polyurethane foam formed from scrap material bonded together with a urethane polymer can be employed. Another example of an acceptable self-supporting pad of spongey material is a polyvinyl chloride sheet made with a decomposable blowing agent. Cellular urethane-formaldehyde sheet materials can also be employed. Other flexible resilient polymeric materials can be employed if the materials exhibit suitable compressive behavior and if the material is capable of functioning as a comfort cushion.

When carpeting 2 is positioned over the sponge cushion 4 at the time of installation of the carpet, it is frequently necessary to slide the carpeting over the sponge cushion. In order to reduce friction between the carpeting and the sponge cushion, it is generally desirable to modify the surface of the sponge cushion, such as by applying a textile scrim 9 over the surface 3 of the sponge cushion 4. The surface 3 can be embossed to increase adhesion between the scrim material and the sponge cushion 4.

The flexible layer 8 and flexible layer 10 can each be comprised of self-supporting, substantially nonstretchable, continuous or discontinuous sheet materials of substantially uniform thickness. The flexible layer 8 and the flexible layer 10 can be formed from the same material or they can be formed from materials having different physical properties or different chemical properties or both. For example, one of the layers usually has a heavier weight than the other layer when the layers are textiles. Each of the sheet materials must have a tensile strength that exceeds the tear strength of the cellular layer in the cushion underlay. Continuous webs and films are preferred for use as the sheet materials although films can serve this function as well. The layers can be comprised of natural or synthetic materials. Woven or nonwoven, thin textile materials are preferred. Nonwoven fabrics made from synthetic fibers are particularly preferred.

The nonwoven fabric can be produced by bonding or interlocking fibers by mechanical means, chemical means, thermal means, solvent means, or combinations thereof. Both unidirectional webs and random webs can be employed in the nonwoven fabrics. Unidirectional webs can be conveniently formed on conventional carding machines. If necessary several unidirectional webs can be crosslapped to increase the strength of the nonwoven fabric. Nonwoven webs can also be formed by wet processes using a Fourdrinier machine. Random webs can be conveniently produced using conventional air deposition techniques.

Suitable nonwoven unidirectional and random webs can be formed from a variety of materials, such as cellulosic materials, acrylic resins, nylon resins, rayon, polyesters, polypropylene, and polyethylene. Rayon and nylon fibers are preferred because of their relative cost, availability, ease of processing, high temperature processability, durability and resistance to mildew.

The web of nonwoven fibers can be held together with a suitable bonding material. Adhesives comprised of polymer solutions or latexes are most commonly employed for this purpose. Examples of suitable bonding materials are acrylic resins, butadiene-acrylic copolymers, butadiene-styrene copolymers, vinyl acetate polymers, vinyl chloride polymers, phenolic resins, melamine resins, and polyurethanes.

Suitable nonwoven fabrics can also be produced by spinbonding straight or crimped filaments. The filaments will typically be derived from polyesters, polyamides, polypropylene, and polyethylene. Spunbonded fabrics produced from filaments consisting essentially of nylon 6,6 in which a minor portion of overlying filaments are bonded together are preferred.

The flexible layer 8 is preferably a very thin, porous material. A textile fabric is preferred. The fabric can be of substantially any weight. The weight of the fabric expressed in ounces per square yard (osy) will typically be about 0.3 osy to about 1 osy. Porous materials, such as open mesh textiles, are particularly preferred, since they are capable of forming strong mechanical bonds with the cellular layer when the precursor of the layer is blown and the resulting cellular material is stabilized. Open mesh scrim fabrics and heat stable fabrics are preferred. Specifically, it is preferable to use a fabric having a low dry heat shrinkage at the temperature at which the cellular material is formed, otherwise the cellular layer can exhibit the appearance of "elephant hide" when the blown material is cooled.

In the particularly preferred embodiment of this invention, a spunbonded, nylon scrim layer is employed as the layer 8 in the cushion underlay. A material of this type is commercially available under the trademark PBN II from James River Corporation, Greenville, S.C. This material has a low dry heat shrinkage (about 1.3%).

The flexible layer 10 is similar to layer 8 and can also be of substantially any weight. For example, a textile material having a weight of about 15 gsy to about 60 gsy (grams per square yard) can be employed. Preferably, the textile material has a weight of about 30 gsy to about 40 gsy.

The flexible layer 10 is preferably less porous than the flexible layer 8 to ensure that the flexible layer 8 is strippable from the layer 10. Thus, for example, when adhesive 12 bonds a scrim layer 8 to a textile web 10, the adhesive will more aggressively flow into the open mesh of layer 8 than the tighter mesh of web 10 and will form a stronger bond with the layer 8. When the carpet is peeled away from the floor as depicted in FIG. 2, the layer 8 will be stripped from the layer 10 because the strength of the bond between adhesive 12 and layer 10 is less than the strength of the bond between adhesive 12 and layer 8.

Ordinarily, most of the adhesive 12 will adhere to the layer 8 during the stripping process, although some of the adhesive may remain on the layer 10. In any event, the amount of adhesive 12 is usually so small that installation of a new surface covering over the layer 10 is not adversely affected by the portion that may remain on layer 10.

In the particularly preferred embodiment of this invention, layer 10 is a 100% rayon carded web having a weight of about 30 gsy. Nonwoven rayon webs meeting these specifications are commercially available.

The layer 8 is mechanically or adhesively secured to layer 10. For example, layer 8 can be mechanically secured to layer 10 by needle punching layer 10 into layer 8 to entangle staple rayon fibers in the spunbonded nylon web. Adhesively securing the layers together has been found to be especially suitable. A wide variety of thermoplastic and thermosetting adhesives of natural or synthetic origin can be employed for this purpose. The adhesive should be flexible when it is cured or set in the cushion underlay. Ordinarily, the adhesive will undergo a phase change or chemical reaction which results in the layers being firmly anchored together, although a pressure sensitive adhesive that does not undergo a phase change or chemical reaction can be employed. The adhesive can be a solid or liquid, and can be a solution, dispersion or suspension. Organic solvent systems can be utilized, or the adhesive can be in the form of an aqueous emulsion or latex. The adhesive can be of the hot melt type which sets on cooling, or the adhesive can be heat curable at an elevated temperature. Examples of some of the adhesives that can be employed in the cushion underlay of this invention are waxes, natural resins, gums, aliphatic pitches, synthetic resins, and similar materials that make it possible to delaminate layers of the cushion underlay under the conditions of use. The synthetic resins include polyesters, urethanes, polyamides, polyimides, silicone resins, acrylic resins, polyvinyl ethers, and amino resins, such as urea-formaldehyde and melamine-formaldehyde resins. The preferred synthetic resins contain ethylenic unsaturation. Ethylene-vinyl acetate polymer resins are particularly preferred.

The adhesive can be applied to the layer 8, the layer 10 or both layers by a wide variety of techniques. For example, the adhesive can be applied by immersion, roller coating, brushing, spray coating, curtain coating, knife coating, or by means of a spatula. In a prefered embodiment of this invention, a spunbonded nylon scrim and a 100% rayon carded web are saturated with an ethylene-vinyl acetate adhesive, and the saturated fabrics are passed through an adhesive flooded nip of a calendar where excess adhesive is squeezed out of the fabrics. The resulting laminate is passed over a series of drying cans to cure the adhesive.

In another method of producing a laminate comprised of the layer 8 and the layer 10, a 100% rayon carded web or a polyester carded web is provided with an adhesive from a gravure roll onto which a powdered polyester adhesive has been deposited by means of a doctor blade. The web containing the powdered adhesive is passed through an oven to melt the powder. A spunbonded nylon web is placed over the melted adhesive, and the resulting laminate is passed through the nip of a calendar where the two webs are bonded together and the laminate is stabilized.

In the preferred embodiment of this invention, the layer 8 is a spunbonded nylon scrim having a weight of about 20 gsy adhesively attached to layer 10 comprised of a 100 percent rayon carded web having a weight of about 30 gsy. Materials of this type are commercially available under the tradename PBN-II or Cerex Type 30 from James River Corporation, Greenville, S.C. A composite of layer 8 and layer 10 is commercially available under the tradename BiWeb from James River Corporation.

The cushion underlay of the invention can be made using conventional equipment and techniques. For example, a gas-expandable mixture can be prepared by compounding a rubber, a thermally decomposable blowing agent and processing additives in a Banbury mixer. A layer of the mixture can be applied to a moving belt and the preferred composite comprising spunbonded nylon scrim layer 8 adhesively attached to rayon carded web 10 can be laid over the mixture. The resulting composite can be passed through an oven at an elevated temperature at which blowing occurs and a cellular layer is formed. The layer can be stabilized by cooling to produce a cushion underlay of the invention.

The surface covering can be secured to the sponge cushion using conventional adhesives. For example, a conventional flooring adhesive can be used to bond the cushion underlay of the invention to a solid support. A similar adhesive can be used to bond a surface covering to the cushion underlay.

It has been found that optimum results are obtained when a relatively thin layer of adhesive is troweled on the solid support and the cushion layer is applied over the adhesive. Specifically, a layer of adhesive 1/16" thick was troweled on a floor and the preferred carpet underlay of the invention was applied over the adhesive. A carpet was then adhesively bonded to the carpet underlay as depicted in FIG. 1. Similar carpet installations were made, except that the adhesive was applied to the floor to form adhesive layers 3/32" thick and ⅛" thick. When each of the carpet installations was subject to dynamic loads from heavy rolling machinery, each installation remained anchored to the floor. When the carpets were stripped from the floor, optimum results were obtained with the thinnest adhesive layer. It appeared that the adhesive in the thicker adhesive layers was present in excess and that the adhesive permeated through the layer 10 into the layer 8 increasing the bond strength between the layers and thereby making it more difficult to strip layer 8 from layer 10 without tearing the sponge cushion 4. Thus, the amount of adhesive for bonding the layer 10 to the solid support should be the minimum amount required for a good bond under the conditions of use.

In summary, this invention provides a cushion underlay for a surface covering and a method for easily stripping the surface covering from a support surface in preparation for installing a new surface covering. The surface covering and the cushion underlay can be securely bonded to a solid support to withstand high compressive loads and lateral forces without the surface covering detaching from the support. In addition, the cushion underlay of the invention and surface covering to which it is bonded can be easily stripped from the solid support without tearing apart the cellular layer in the cushion underlay.

What is claimed is:

1. A laminate comprising:
   (A) a solid, flexible, resilient, cellular layer having a top surface for bonding to an underside of a surface covering and an opposing bottom surface;
   (B) a solid, flexible, non-strippable first layer having opposing first and second surfaces, wherein the first surface of the first layer is adhered to the bottom surface of the cellular layer;
   (C) a solid, flexible, second layer adhered to the second surface of the first layer; and
   (D) a surface covering adhesively bonded to the top surface of the cellular layer;
   wherein, when the second layer of the laminate is secured to a solid support and the surface covering is pulled away from the solid support, the second layer adheres to the support and the surface covering, cellular layer, and first layer are strippable from the second layer.

2. The laminate as claimed in claim 1, wherein the cellular layer is comprised of sponge rubber.

3. The laminate as claimed in claim 1, wherein the cellular layer is comprised of a foamed polymer or copolymer.

4. The laminate as claimed in claim 3, wherein the foamed polymer or copolymer is an elastomer.

5. The laminate as claimed in claim 1, wherein the first layer and the second layer are each comprised of a textile material.

6. The laminate as claimed in claim 5, wherein the textile material is a nonwoven fabric.

7. The laminate as claimed in claim 6, wherein the first layer is comprised of a nonwoven scrim material.

8. The laminate as claimed in claim 6, wherein the first layer is a spunbonded nylon fabric.

9. The laminate as claimed in claim 6, wherein the second layer is a nonwoven fabric comprised of carded, rayon fibers.

10. The laminate as claimed in claim 6, wherein the first layer is adhesively bonded to the second layer.

11. The laminate as claimed in claim 10, wherein the cellular layer is comprised of a sponge rubber, and the first layer is bonded to the second layer in situ during blowing of a precursor of the cellular layer followed by stabilization of the resulting blown material.

12. The laminate as claimed in claim 11, wherein a textile fabric is adhered to the top surface of the cellular layer.

13. A cushion underlay for a carpet, wherein the cushion underlay comprises:
   (A) a solid, flexible, resilient, cellular layer having a top surface for bonding to an underside of a carpet and an opposing bottom surface;
   (B) a self-supporting, flexible, nonwoven, scrim textile layer having an open mesh and opposing first and second surfaces, wherein the first surface of the scrim layer is adhered to the bottom of the cellular layer;

(C) a self-supporting, flexible, nonwoven, textile web having a denser mesh than the open mesh of the scrim layer, wherein said web is adhesively bonded to the second surface of the scrim layer;

wherein, when the scrim layer is secured to solid support and the cushion underlay is pulled away from the solid support, the scrim layer is strippable from the textile web without tearing the cellular layer, but the cellular layer is not strippable from the scrim layer.

14. Cushion underlay as claimed in claim 13, wherein the cellular layer is comprised of sponge rubber.

15. Cushion underlay as claimed in claim 13, wherein the scrim layer is a spunbonded web.

16. Cushion underlay as claimed in claim 15, wherein the textile web is a carded web.

17. Cushion underlay as claimed in claim 16, wherein the scrim layer has a weight of about 0.3 osy to about 1 osy and the unbonded carded web has a weight of about 15 gsy to about 60 gsy.

18. Cushion underlay as claimed in claim 16, wherein the scrim layer has a weight of about 0.5 osy to about 0.7 osy, and the unbonded carded web has a weight of about 30 gsy to about 40 gsy.

19. Cushion underlay as claimed in claim 18, wherein the scrim layer consists essentially of nylon and the carded web consists essentially of rayon.

20. Cushion underlay as claimed in claim 19, wherein the scrim layer is bonded to the carded web with an ethylene-vinyl acetate adhesive or a polyester adhesive.

21. Cushion underlay as claimed in claim 20, wherein the cellular layer is comprised of polyurethane.

22. A laminate comprising:
(A) a cushion underlay as claimed in claim 13; and
(B) a carpet adhesively bonded to the top surface of the cellular layer;
wherein the carpet is not strippable from the cellular layer.

23. Laminate as claimed in claim 22, wherein the nonwoven textile web is secured to a floor, a wall or a ceiling with an adhesive in an amount such that the scrim layer is strippable from the nonwoven web, but the nonwoven web is not strippable from the floor.

24. Method of installing a strippable surface covering and cushion underlay on a solid support, wherein the method comprises:
(A) providing a cushion underlay for the surface covering, wherein the cushion underlay comprises
(1) a solid, flexible, resilient, cellular layer having a top surface for bonding to an underside of a surface covering and an opposing bottom surface;
(2) a solid, flexible, non-strippable first layer having opposing first and second surfaces, wherein the first surface of the first layer is adhered to the bottom surface of the cellular layer; and
(3) a solid, flexible, second layer adhered to the second surface of the first layer;
(B) adhesively securing the cushion underlay to a solid support; and
(C) adhesively securing the surface covering to the top surface of the cellular layer;
wherein the second layer adheres to the support, and the surface covering, cellular layer and first layer are strippable from the second layer when the surface covering is pulled away from the support.

25. Method as claimed in claim 24, wherein the first layer and the second layer are comprised of nonwoven textile materials.

26. Method as claimed in claim 25, wherein the first layer is comprised of a nonwoven, spunbonded nylon material and the second layer is comprised of nonwoven web of carded rayon fibers.

27. Method as claimed in claim 24, which comprises the additional step of stripping the surface covering, cellular layer and first layer from the second layer.

28. Method as claimed in claim 27, wherein the first layer and the second layer are comprised of nonwoven textile materials.

29. Method as claimed in claim 28, wherein the first layer is comprised of a nonwoven spunbonded nylon material and the second layer is comprised of nonwoven web of carded rayon fibers.

30. Method of installing a strippable surface covering and cushion underlay on a solid support, wherein the method comprises:
(A) providing a cushion underlay for the surface covering, wherein the cushion underlay comprises the cushion underlay as claimed in claim 13;
(B) adhesively securing the cushion underlay to a solid support; and
(C) adhesively securing the surface covering to the top surface of the cellular layer;
wherein the second layer adheres to the support, and the surface covering, cellular layer and first layer are strippable from the second layer when the surface covering is pulled away from the support.

31. Method as claimed in claim 30, wherein the first layer and the second layer are comprised of nonwoven textile materials.

32. Method as claimed in claim 31, wherein the first layer is comprised of a nonwoven, spunbonded nylon material and the second layer is comprised of nonwoven web of carded rayon fibers.

33. Method as claimed in claim 30, which comprises the additional step of stripping the surface covering, cellular layer and first layer from the second layer.

34. Method as claimed in claim 33, wherein the first layer and the second layer are comprised of nonwoven textile materials.

35. Method as claimed in calim 34, wherein the first layer is comprised of a nonwoven spunbonded nylon material and the second layer is comprised of nonwoven web of carded rayon fibers.

* * * * *